United States Patent
Marathe et al.

(10) Patent No.: US 10,061,601 B2
(45) Date of Patent: Aug. 28, 2018

(54) COMPONENT NAVIGATION IN AN EXTENSIBLE APPLICATION

(75) Inventors: Shraddha Vijay Marathe, Sunnyvale, CA (US); Imran Q. Sayed, Mountain View, CA (US)

(73) Assignee: VMware, Inc.

( * ) Notice: Subject to any disclaimer, the term of this patent is extended or adjusted under 35 U.S.C. 154(b) by 1406 days.

(21) Appl. No.: 13/167,278

(22) Filed: Jun. 23, 2011

(65) Prior Publication Data

US 2012/0331488 A1 Dec. 27, 2012

(51) Int. Cl.
*G06F 3/00* (2006.01)
*G06F 9/445* (2018.01)
*G06F 9/54* (2006.01)

(52) U.S. Cl.
CPC ............ *G06F 9/44526* (2013.01); *G06F 9/54* (2013.01)

(58) Field of Classification Search
CPC ............. G06F 9/541; G06F 9/547; G06F 9/54
USPC ........................................................ 719/310
See application file for complete search history.

(56) References Cited

U.S. PATENT DOCUMENTS

| | | | | |
|---|---|---|---|---|
| 6,377,939 B1 * | 4/2002 | Young | ............................. | 705/34 |
| 6,842,856 B2 * | 1/2005 | Shenassa et al. | .................. | 713/1 |
| 7,478,170 B2 * | 1/2009 | Ong et al. | ...................... | 709/246 |
| 8,196,132 B2 * | 6/2012 | Ergo et al. | ...................... | 717/172 |
| 2005/0188384 A1 * | 8/2005 | Yogaratnam et al. | ........ | 719/331 |
| 2009/0083213 A1 * | 3/2009 | Haynes et al. | .................... | 707/2 |
| 2012/0331488 A1 * | 12/2012 | Marathe et al. | .............. | 719/331 |

OTHER PUBLICATIONS

Jan Griebsch, xAnVi-An Extensible Visualization and Analysis Framework, 2006.*

* cited by examiner

*Primary Examiner* — Lechi Truong
(74) *Attorney, Agent, or Firm* — Clayton, McKay & Bailey, PC

(57) ABSTRACT

In one embodiment, a method receives configuration information for a set of components of an extensible application. A component in the set of components includes extending information if the component is an extension of another component and hosting information if the component is hosting a set of extension points. A computing device dynamically generates an extension structure at runtime of the application from the configuration information. The extension structure is generated by connecting components together based on the extending information and the hosting information of the set of components. A navigation request to a target component is received and a path of components to the target component is determined using the extension structure. The path of components is traversed until the target component is loaded and the target component is displayed.

20 Claims, 13 Drawing Sheets

```
                                            802                                    800
<extension id = "some.namespace1.climateView">      504a
...
    <hostedPoint>some.namespace1.cityClimateDetails</hostedPoint>
    <componentInfo>
        <name>Climate</name>                                                  } 804
        <componentClass className="some.namespace1.climateView"/>
    </componentInfo>
</extension>

...
                                            806
<extensionPoint id = "some.namespace1.cityClimateDetails">

...

</extensionPoint>
```

```
                                            808                                    801
<extension id = "some.namespace2.weatherView">
    <extendedPoint>some.namespace1.cityClimateDetails</extendedPoint>
    <componentInfo>                              810
        <name>Current Weather</name>                                          } 812
        <componentClass className="some.namespace2.WeatherView"/>
    </componentInfo>
</extension>
```

Fig. 8a

```
public class ClimateView implements ICompositeComponent
      {
            public void activateChildComponent(String componentID) {callback}
      }
...

public class WeatherView
      {
...
            public String selectedCity {get;set;}
            public int numberOfForecastDays {get;set;}
      }
...
```

Fig. 8b

```
   NavigationRequest: {
         targetComponentId = "some.namespace2.weatherView"
         targetProperties = {
               ("selectedCity", "Palo Alto"),
               ("numberofForecastDays", 3)
         }
   }
```

Fig. 8c

COMPONENT NAVIGATION IN AN EXTENSIBLE APPLICATION

BACKGROUND

Particular embodiments generally relate to extensible applications.

In an "extensible" application, a developer of an application may enable third parties to "extend" the application with additional functionality through the application's "extension framework," for example, by adding third party developed plug-ins or other similar add-on technologies to the application. Such extensibility is particularly useful for extending a graphical user interface (GUI) of an application, enabling third party plug-ins to add their own views and/or other GUI components to the application by extending certain well-defined "extension points" exposed by the application's extension framework. One example of a GUI extension point that may be exposed by an application's extension framework is a capability to add an additional tab panel to a strip of tabs panels that make up a main panel of the application. In "fully" extensible applications, these third party plug-ins can also further define new GUI extension points that could then be extended by yet other third party plug-ins. However, the flexibility provided by such fully extensible applications also introduces complexities in navigating the GUI of such applications because the application itself simply has no knowledge of new GUI extensions from extension points of the application itself or from additional extension points further provided by third party plug-ins.

For example, in certain situations, it may be desirable in a fully extensible application to provide navigational links to certain views or parts of the GUI that provide more information about a particular object or concept. A third party developer of a plug-in may desire to provide a user the capability to navigate (e.g., via a link) from a GUI component of its plug-in to another part of the application's GUI (not necessarily written by the developer itself). For example, the developer may desire to offer a plug-in extension showing a health view for a set of objects giving high level health statistics of each object. The developer may also desire to provide a navigational link (e.g., a "More Details" link) in this view for each object so that the user can navigate to an "Issues" view to perform troubleshooting analysis. This "Issues" view for an object may have already been developed and added to the application by another third party developer as an extension. However, because the application itself is unaware of the Issues view that has been added as an extension, the third party developer is unable to request the application to navigate to the Issues view from a GUI component of the developer's own plug-in.

The inability of the application to navigate to the Issues view stems from the "static" nature of the application's "navigation framework," which hard-codes the extension structure of the application and pre-defines how a user can navigate within different parts of the application. Such "static" navigation frameworks limit the flexibility of third party enhancements to an application. As illustrated above, because the navigation framework above cannot access GUI components (or other objects) of the main display of a plug-in, a plug-in developed by one third party cannot include a link (or other GUI component) within its main display which, when selected, causes a tab panel (or other GUI component) nested or embedded in the main display of another plug-in developed by a different third party to be displayed. In contrast to the static navigation frameworks described above, in an extensible application having a more flexible navigation framework, the navigation framework would enable a user to request navigation from any component (e.g., a view) to any other component. The navigation framework would accommodate arbitrary jumps to any component of any plug-in even if the component is arbitrarily nested within other components, has not been loaded into the application at the time of the navigation request or is subsequently moved to a different location within the GUI.

SUMMARY

In one embodiment, a method receives configuration information for a set of components of an extensible application. A component in the set of components includes extending information if the component is an extension of another component and hosting information if the component is hosting a set of extension points. A computing device dynamically generates an extension structure at runtime of the application from the configuration information. The extension structure is generated by connecting components together based on the extending information and the hosting information of the set of components. A navigation request to a target component is received and a path of components to the target component is determined using the extension structure. The path of components is traversed until the target component is loaded and the target component is displayed.

In one embodiment, the extending information for a component identifies an extension point that the component is extending.

In one embodiment, the hosting information for a component identifies one or more extension points the component hosts and allows other components to reference an extension point of the component.

In one embodiment, a method includes receiving an extension to an extensible application. The extension specifies, for a component, extending information if the component is an extension of another component and hosting information if the component is hosting an extension point. A computing device dynamically generates an extension structure at runtime of the extensible application, wherein the extension structure is generated by connecting components of the application together based on extending information and hosting information of the components, wherein the extension is realized in the extension structure. The method then receives a navigation request to a target component; determines a path of components to the target component through the extension structure; and requests, using a navigation manager, a loading of a component of the path with callback information to the navigation manager. Confirmation that the component has been loaded is received via the callback information. The method continues the requesting with other components in the path until the target component is loaded and confirmation is received for the loading of the other components and the target component and the loaded components are displayed.

In one embodiment, configuration information for the components of the extensible application is determined. The extension is specified in configuration information to extend the application.

In one embodiment, a non-transitory computer-readable storage medium containing instructions is provided. The instructions are for controlling a computer system to be operable to: receive configuration information for a set of components of an extensible application, wherein a component in the set of components includes extending information if the component is an extension of another component and hosting information if the component is hosting a set of extension points; dynamically generate an extension structure at runtime of the application from the configuration information, wherein the extension structure is generated by connecting components together based on the extending information and the hosting information of the set of components; receive a navigation request to a target component; determine a path of components to the target component using the extension structure; traverse the path of components until the target component is loaded; and display the target component.

The following detailed description and accompanying drawings provide a more detailed understanding of the nature and advantages of the present invention.

BRIEF DESCRIPTION OF THE DRAWINGS

FIG. 8a shows an example of extension and hosting information in configuration files according to one embodiment.

FIG. 8b shows an example of pseudo-code for components that are compliant with a navigation framework according to one embodiment.

FIG. 8c shows an example of a structure of a navigation request received by a navigation manager according to one embodiment.

DETAILED DESCRIPTION

In the following description, for purposes of explanation, numerous examples and specific details are set forth in order to provide a thorough understanding of embodiments of the present invention. Particular embodiments as defined by the claims may include some or all of the features in these examples alone or in combination with other features described below, and may further include modifications and equivalents of the features and concepts described herein. For example, while the following embodiment may generally describe "components" that are GUI-based components of an application, it should be recognized that interaction among components as described herein also apply to embodiments where such interacting components may include non-GUI based components or objects of the application.

Figure 1:
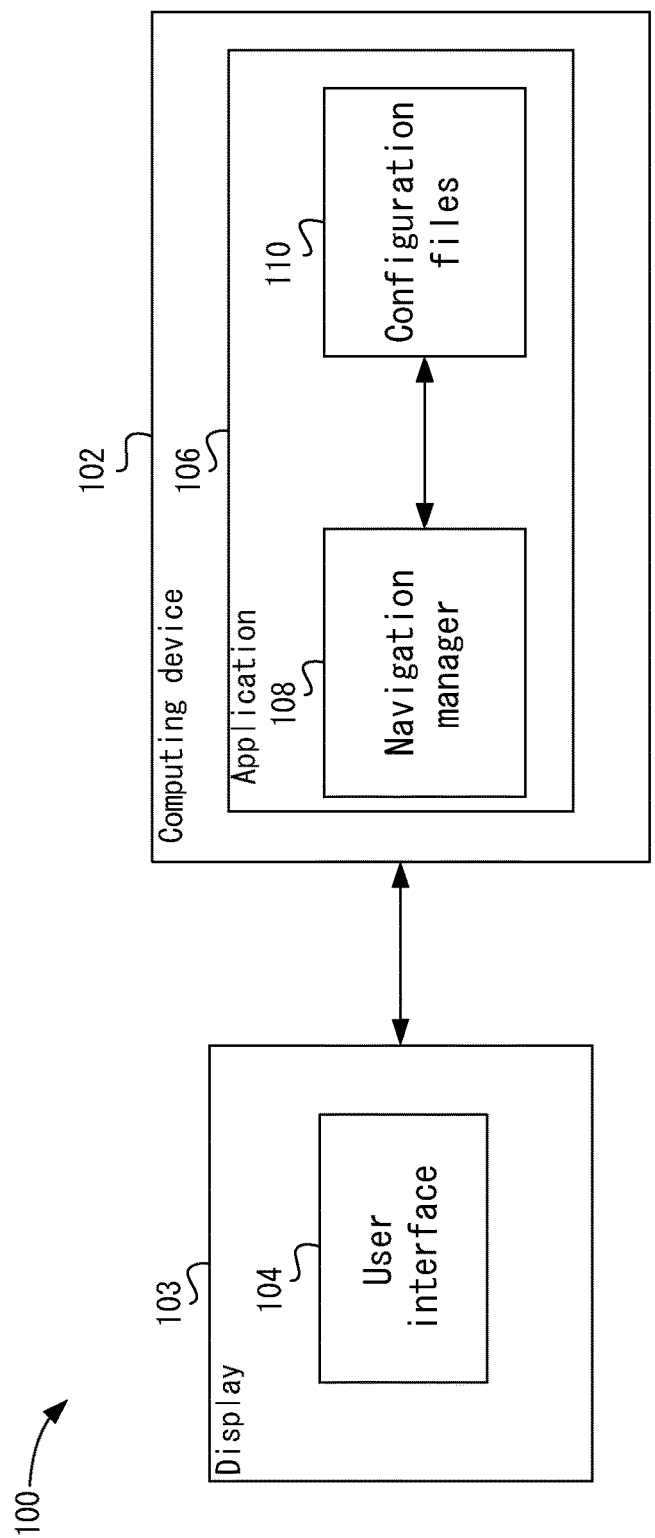
FIG. 1 depicts an example of a system for providing an extensible application according to one embodiment.

FIG. 1 depicts an example of a system 100 for providing an extensible application according to one embodiment. System 100 includes a computing device 102 and a display 103. Display 103 includes a graphical user interface (GUI) 104 provided by application 106. Functions described with respect to computing device 102 may be performed on a single device or distributed among multiple devices. Also, display 103 and graphical user interface 104 may be located on a different computing device than computing device 102 (e.g., in a client-server relationship) or may be integrated with computing device 102.

Application 106 in computing device 102 may include a number of GUI-based components that may be rendered in GUI 104 (hereinafter, generally referred to as "components"). Examples of such components include panels (e.g., scroll panels, tab panels, etc.), interactive display components (e.g., text areas, tables, trees, links, etc.), control components (e.g., buttons, lists, menus, text fields, etc.) and other components. It should be recognized that the various components may also be embedded or otherwise nested within other components (e.g., a set of tab panels may be nested within a parent tab panel, etc.). One example of set of GUI based components that may be used by application 106 is the Java Swing widgets provided by Oracle.

Application 106 also includes a navigation manager 108 and configuration files 110. Navigation manager 108 controls the navigation among components of application 106 and also the display of the appropriate components on GUI 104. For example, navigation manager 108 receives a navigation request as a result of an action taken by a user on GUI 104 and processes the request to display different components on GUI 104.

Configuration files 110 include information for components of application 106 that assist navigation manager 108 in navigating among components of application 106 in GUI 104. For example, each component that may be rendered in GUI 104 may have a corresponding configuration file 110. In one embodiment, each such configuration file may organize information according to XML or any other similar tagging or markup language that is understood by navigation manager 108. If, for example, a third party developer desires to extend the functionality of application 105 by adding a plug-in or other similar add-on technology, the plug-in "bundle" that is installed or otherwise loaded into application 106 may, in accordance with the extension framework and navigation framework imposed by application 106, require inclusion of configuration files that correspond to the components in the plug-in. As further detailed herein, a configuration file for a component identifies an "extension point" that the component is extending and/or also identifies the extension points that the component is "hosting." Information that identifies the extension point the component is extending is referred to as "extending information" and information identifying the extension points the component is hosting is referred to as "hosting information." It should be recognized that configuration files as referred to herein may be persistently stored in certain embodiments or dynamically generated in other embodiments (for example, upon launch of application 106).

During execution of application 106, navigation manager 108 utilizes configuration files 110 to dynamically generate an "extension structure." For example, in one embodiment, such an extension structure is generated when application 106 is initially launched and then re-generated in the event a third party plug-in is subsequently loaded into application 106 as further discussed below. In one embodiment, a navigation framework imposed by navigation manager 108 on components of application 106 may require each component (i) to serve as an "extension" connected to an "extension point" of another component, and (ii) to be capable of "hosting" extension points for other components. In such an embodiment and as further described herein, for each component, navigation manager 108 accesses configuration files 110 to obtain extending information and/or hosting information to determine how the component is coupled to other components. If a configuration file 110 (or component thereof) relating to a particular component indicates that the particular component is an "extension" connected to an "extension point" of another component, then navigation manager 108 connects the other component to the particular component in the generated extension structure, for example, as a "parent" component of the particular component. Similarly, if the configuration file 110 indicates that the particular component itself serves as a host for other extension points, then navigation manager 108 connects those other components (e.g., also referred to as "extensions" of the particular component) corresponding to those extension points in the generated extension structure, for example, as "child" components of the particular component. In one embodiment, for example, the extension structure that is generated is hierarchical, such as a tree structure although it should be recognized that other data structures may be utilized in the extension structure.

Because the extension structure is dynamically generated by application 106 during runtime, application 106 has the characteristic that it is dynamically and flexibly extensible. For example, in one embodiment, the extension structure is initially generated upon launch of application 106. If a plug-in is subsequently installed in application 106 after launch of application 106 causing components and corresponding configuration files 110 to be added, deleted, or modified, then navigation manager 108 may regenerate the extension structure for application 106 at that time. Because navigation manager 108 dynamically generates the extension structure in this manner, plug-ins or other add-on technologies that extend application 106 may be added components to any section of the extension structure. Navigation manager 108 does not need to be hard-coded to understand where a component can be inserted within the GUI structure of application 106. Rather, navigation manager 108 interprets the extending information and hosting information to generate the extension structure. Then, navigation is performed using the extension structure.

Figure 2:
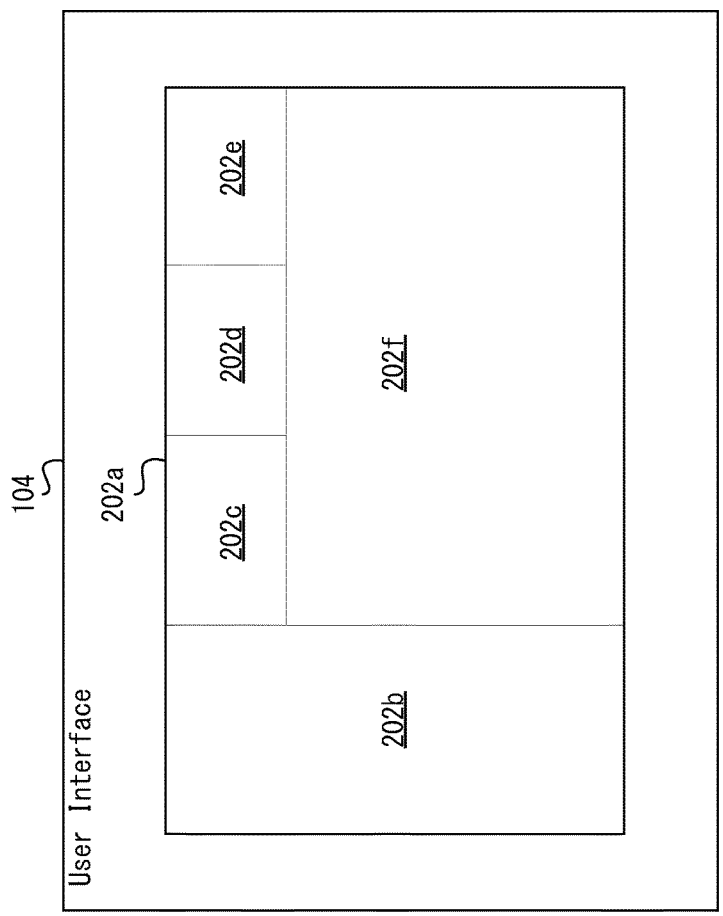
FIG. 2 depicts an example of a graphical user interface according to one embodiment.

FIG. 2 depicts an example of GUI 104 according to one embodiment. GUI 104 is displaying components of application 106. For example, application 106 may be used to manage a data center that includes a virtualized environment including hosts and virtual machines running on the hosts. Sections 202a-202f may correspond to different components that each include extending and hosting information in configuration files 110. For example, section 202a may represent a "root" panel or container component for application 106 that houses other embedded or nested components, such as section 202b which may comprise a navigation panel that displays a list of objects that can be viewed in a main panel in section 202f. Views of objects that are selected by a user from the list in the navigation panel may be loaded as one of tab panels in sections 202c, 202d or 202e and receive focus in the main panel of section 202f upon selection. In one exemplary user interaction scenario, a user may select an embedded component (e.g., such as a link or button) in main panel 202f that, for example, may be currently displaying the contents of tab panel 202c. A user's selection or activation of the embedded component may then generate a navigation request (handled by navigation manager 108) to navigate to another component that can be rendered in GUI 104. The navigation request may result, for example, in a change of focus in the main panel from tab panel 202c to tab panel 202e. In one embodiment, the navigation request may further include information that enables navigation manager 108 to set a state of a target component in tab panel 202e that is to be displayed (e.g., highlight a text area, etc.).

In one embodiment, the navigation request includes an identifier for the target component that is to be displayed, which as previously discussed, may be nested in multiple other components. For example, as discussed above, section 202f may display a component that is nested within several other components, including root container 202a, main display 202f and a selected tab panel 202e that is displayed within main display 202f. In one embodiment, while the target component is identified in the navigation request, the other components in the nesting are not identified. However, as should be recognized, in order to properly display the target component, all the other components within which it is nested (e.g., referred to herein as a "path" to the target component) need to be loaded and rendered in GUI 104. As will be discussed in more detail below, navigation manager 108 uses the extension structure that it dynamically generates in order to determine a path from the root component of application 106 to the target component. Components in the path are then loaded and rendered into GUI 104 until the target component is reached and can therefore be rendered. Additionally, as previously discussed, navigation manager 108 may also, at the time of rendering the target component, set additional properties or settings of the target component in accordance with the navigation request (e.g., highlighting, etc.).

Figure 3:
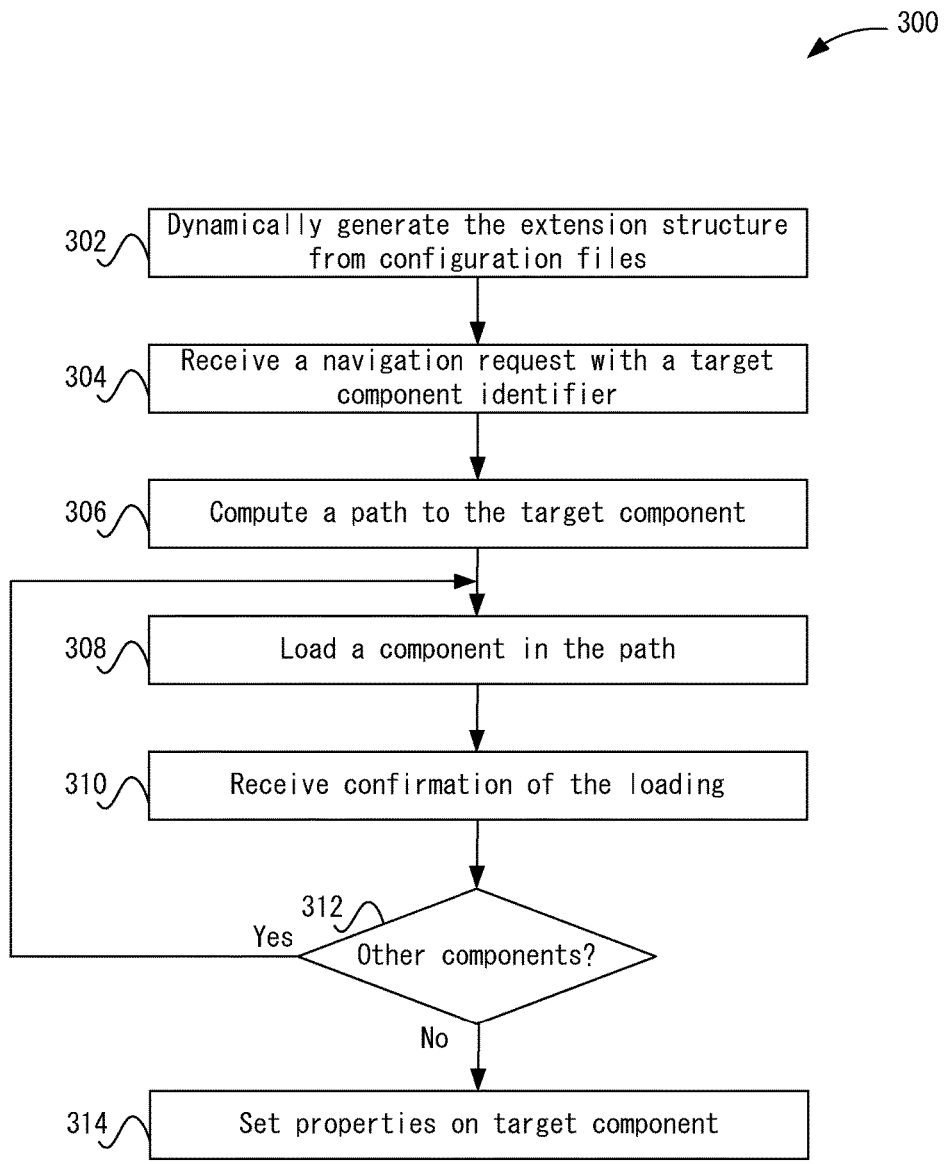
FIG. 3 depicts a simplified flowchart for a method for processing a navigation request according to one embodiment.

FIG. 3 depicts a method for processing a navigation request according to one embodiment. At 302, navigation manager 108 dynamically generates the extension structure from configuration files 110 for application 106. It should be recognized that the extension structure may be generated at different times. For example, in one embodiment, the extension structure is generated when application 106 is launched and then, subsequently, if a plug-in is installed or otherwise loaded into application 106, causing an addition, removal or modification of components that may be rendered in GUI 104.

At 304, as a result of a user interaction with GUI 104, navigation manager 108 receives a navigation request that includes a target component identifier. For example, the component that is selected by a user in GUI 104 resulting in generation of the navigation request may provide the identifier for the navigation request. In one embodiment, if the user-selected component is part of a plug-in developed by a third party and the target component is part of a different plug-in developed by another third party, the user-selected component may obtain the target component identifier from its published documentation or a portion of configuration files 110 corresponding to the plug-in of the target component (e.g., a value associated with a particular tag in an XML configuration file associated with the plug-in of the target component, etc.). In one embodiment, the target component identifier may be the name of the component which a user wants to navigate to on GUI 104. However, it should be recognized that the target component identifier may be any value that can uniquely identify the target component within a plurality of components that make up application 106. In one embodiment, the navigation request identifies the target component but does not describe the whole hierarchy of nested components within which the target component resides. For example, the navigation request may include an identifier of the target component, but not identifiers of other components that are traversed to reach the target component.

At 306, navigation manager 108 computes a path to the target component using the generated extension structure. For example, the path may be from a root component of application 106 (e.g., root container 202a) to the target component. In one embodiment, only a single path is possible through the extension structure. However, if multiple paths are possible, then other information in configuration files 110 or a filtering mechanism may be used to select a path and/or filter paths along the way. For example, metadata may be used to determine a preferred path to take.

Figure 4:
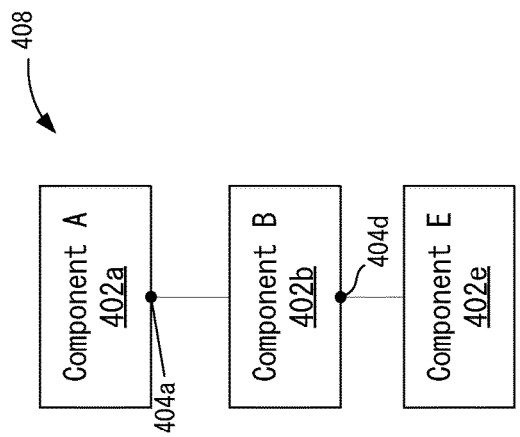
FIG. 4 depicts an example of an extension structure and a computed path through the extension structure according to one embodiment.
Figure 4:
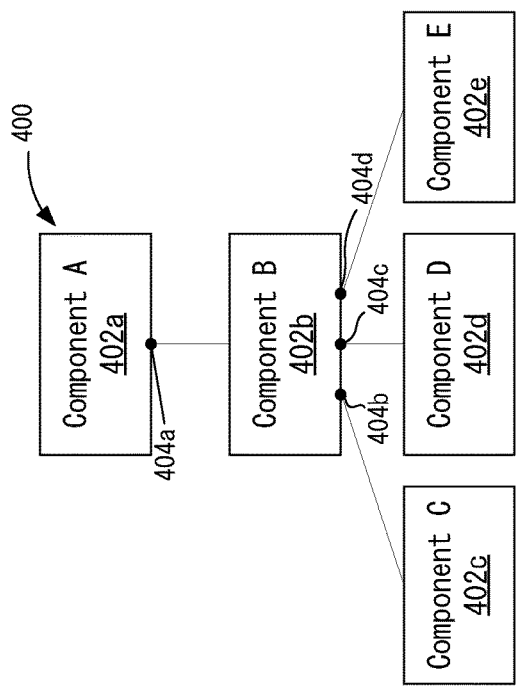

FIG. 4 depicts an example of an extension structure 400 and a computed path through extension structure 400 according to one embodiment. Extension structure 400 includes a plurality of components 402a-e (Components A-E). Components 402 may be extensions of an extension point 404 or may be hosting extension points 404. For example, component A 402a is hosting an extension point 404a, but does not extend any extension point. Component A 402a may be considered a root component. Component B 402b is an extension of extension point 404a. Also, component B 402b is hosting extension points 404b, 404c, and 404d. In this case, component B 402b is both an extension and a host for other extensions. Components 402c, 402d, and 402e are extensions of extension points 404b, 404c, and 404d, respectively. In one embodiment, extension points 404b, 404c, and 404d may be the same extension point (i.e., identified by the same extension point identifier). For discussion purposes, different extension points are shown.

If the target component is component E 402e, navigation manager 108 computes a path from the root component to the target component. As shown at 408, the path is through component A 402a, component B 402b, and component E 402e.

Referring back to FIG. 3, with the path computed from 306, navigation manager 108 is now able to begin loading and rendering the "parent" components in the path, starting, for example, at a root component in order to ultimately render the target component that is nested within those parent components. In one embodiment, the loading or rendering of components in the path as set forth in steps 308 to 312 is implemented by navigation manager 108 through the use of a callback mechanism. In such an embodiment, the navigation framework imposed by navigation manager 108 may require that each component that serves as a host to an extension point implement a common API method (or other similar function call—see, e.g., the activateChildComponent ( ) method in FIG. 8b) that can be used to request rendering of or activation of a named child component (e.g., the extension of the extension point). For example, at 308, navigation manager 108 loads a first component 402 in the path (e.g., to the extent it has not already been loaded) and also registers a callback function with an underlying display rendering engine such that the callback function is automatically invoked when the display rendering engine has completed loading or rendering component 402. Upon invocation of the callback function, code in the callback function confirms, at 310, whether the display rendering engine successfully loaded or rendered component 402 (e.g., via a return flag environment set by the display rendering engine in one embodiment). If the loading or rendering was successful, then, if there are more components in the path as determined at 312, code in the callback function further requests that component 402 invoke its API method (e.g., the activateChildComponent ( ) method further discussed in the context of FIG. 8b) to render it's child component (as identified in the computed path) and similarly registers the callback function to be notified of completion of the rendering of the child component. As should be recognized, this callback mechanism will continue through the computed path until the target component has finally been reached and rendered in GUI 104. Furthermore, it should be recognized that if any particular rendering of a parent component fails, an error may be generated or the navigation may be cancelled. It should further be recognized that such a callback mechanism is merely one way to render the computed path and that alternative embodiments may utilize other methods and techniques to render the computer path to the target component.

Referring to FIG. 4, in one example utilizing the above callback mechanisms, navigation manager 108 loads root component A 402a first. Navigation manager 108 receives confirmation when root component A 402a is loaded. Then, navigation manager 108 requests that root component A 402a load child component B 402b and also registers the callback function to be invoked when child component B 402b has been successfully loaded. Once component A 402a successfully renders or loads child component B 402b, the callback function of navigation manager 108 is invoked (and is provided a handle or reference to the now loaded child component B 402b). Within the callback function, navigation manager 108 confirms the successful loading of child component B 402b, determines that component E 402e is a child of component B 402b, for example, by referencing the next component identifier in the computed path, and sends a request to the loaded component B 402b to itself load child component E 402e (and, if necessary, also registers the callback function to be invoked upon completion of the loading child component E 402e). When component B 402b loads child component E 402e, confirmation containing the actual loaded component 402e is provided to navigation manager 108 via the callback function. At this point, navigation manager 108 knows that all components 402 in the path have been loaded. Navigation manager 108 can also validate the given navigation request because confirmation is received from each component 402 in the path. Thus, errors in navigation can be determined.

Referring back to FIG. 3, at 314, navigation manager 108 may set properties in target component E 402e. For example, the properties may be specified in the navigation request or in configuration files 110. The properties that are set may be any context that component E 402e (or other components 402) needs to retrieve and display information about or formatting/rendering of component E 402e on GUI 104. For example, properties are set to highlight certain data in the view for a context object or maximize a view.

By dynamically generating the extension structure at runtime, navigation may be performed without modifying code for navigation manager 108. For example, configuration files 110 for components 402 may be modified by changing either a component's extending information or hosting information to alter the extension structure. Upon generation of the extension structure, the extension is realized. However, navigation manager 108 does not need to be changed to handle the extension. Rather, the process of computing the path and loading components 402 remains the same except a path might be different to a target component.

Figure 5A:
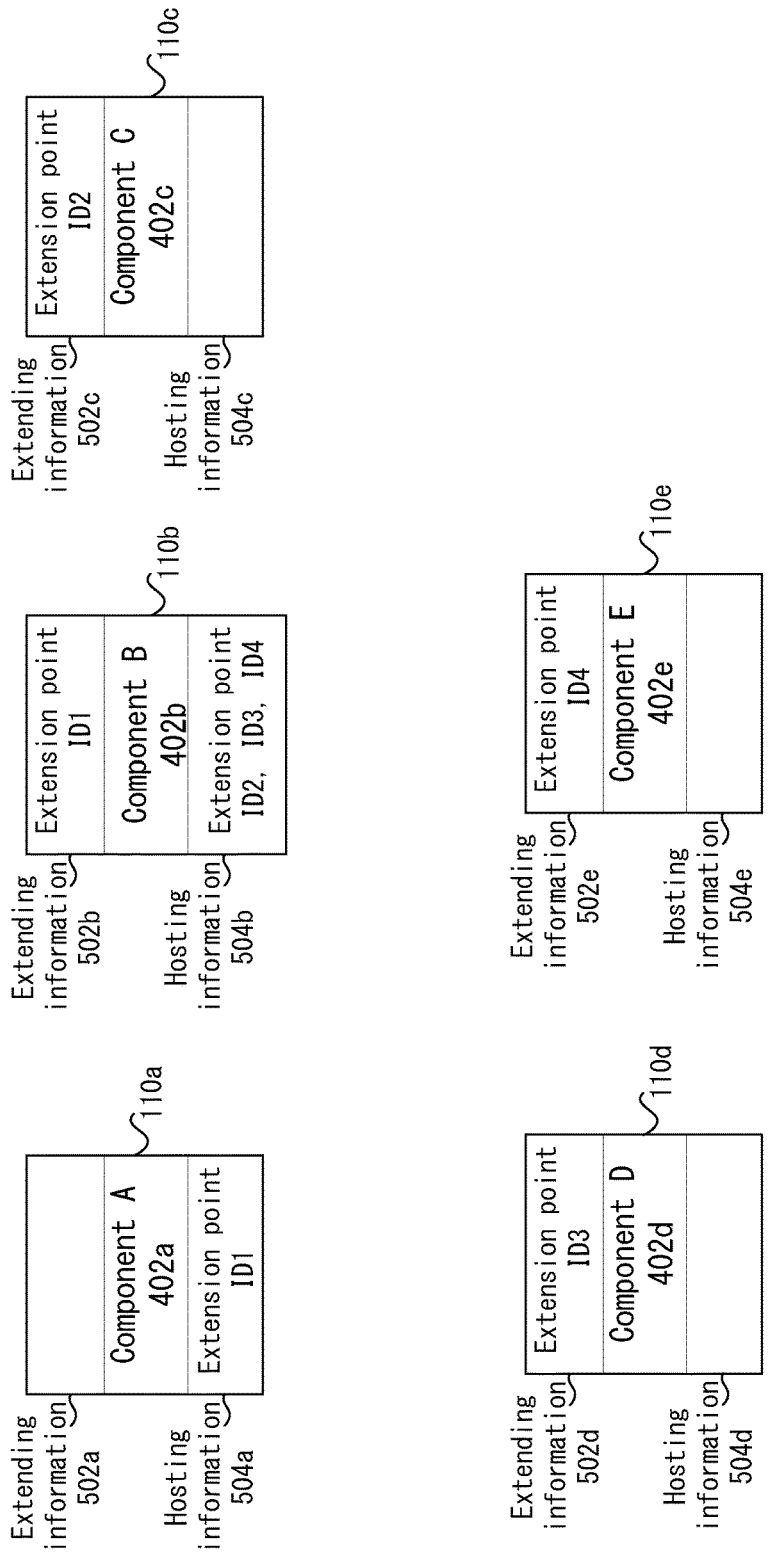
FIG. 5a shows configuration files before an extension according to one embodiment.

The process of extending application 106 will now be described in more detail. FIGS. 5a-5e show an example of extending application 106 according to one embodiment. FIG. 5a shows configuration files 110 before an extension according to one embodiment. As shown, configuration files 110a-110e correspond to components A-E 402a-402e. Configuration files 110a-110e are used to generate extension structure 400 of FIG. 4.

Each configuration file 110 may include extending information 502 and/or hosting information 504 depending on whether the component is an extension of another component or hosting extension points. Configuration file 110a includes hosting information 504a of extension point identifier ID1 for extension point 404a. Extension point identifier ID1 is an identifier for extension point 404a. Extending information 502a is not included because component A 402a is not an extension of any other component 402, but is the root component.

Configuration file 110b includes extending information 502b of the extension point identifier ID1 and also hosting information 504b of extension point identifiers ID2, ID3, and ID4. In this case, component B 402b is connected to extension point identifier ID1 as an extension and is hosting extension points of extension point identifiers ID2, ID3, and ID4.

Configuration file 110c includes extending information 502c of extension point identifier ID2. No hosting information 504 is included because no extension points are being hosted by component C 402c. For component D 402d and component E 402e, configuration files 110d and 110e include extending information 502c and 502d that indicate component D 402d and component E 402e are extensions of extension point identifier ID3 and extension point identifier ID4, respectively. No hosting information 504 is included for component D 402d and component E 402e.

In one embodiment, a third party developer may want to develop a plug-in or other similar add-on technology to extend application 106 by adding a component as an extension to component E 402e. This adds another level of components in the nested structure of application 106. For example, a user may add a component F 402f to application 106.

Figure 5B:
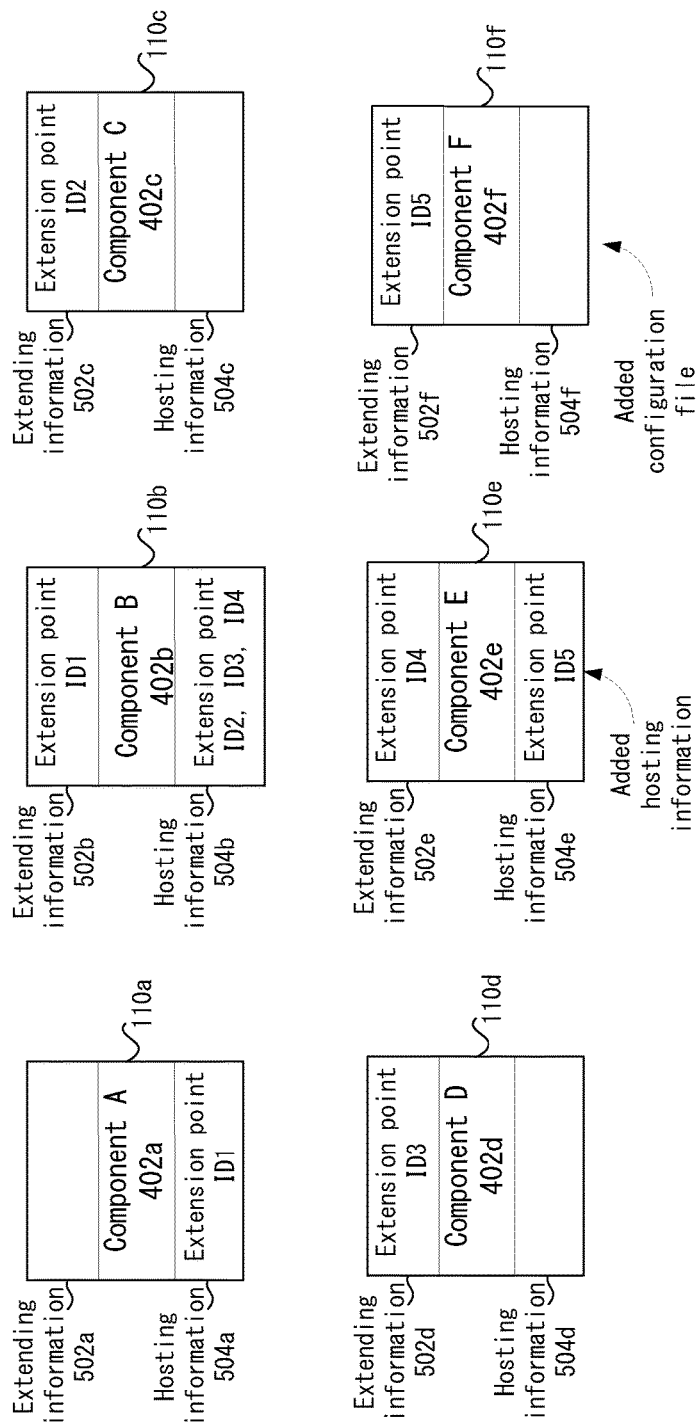
FIG. 5b shows the changes to configuration files to perform the extension according to one embodiment.

To perform the extension, configuration files 110 are added or modified. For example, in one embodiment, new configuration files corresponding to components of a new plug-in and modified configuration files to replace existing portions of configuration files 110 (or instructions to modify such existing configuration files 110) in application 106 are included as part of a plug-in "bundle" (e.g., including executable code for the plug-in) that is installed or otherwise loaded by a third party developer into application 106 to provide extended functionality. FIG. 5b shows changes to configuration files 110 to perform the extension of component F 402f according to one embodiment. To add the extension, a change to component E 402e is needed to indicate that component E 402e is hosting an extension point. For example, hosting information 504e is added (e.g., by the third party developer of the new plug-in) to include an extension point identifier ID5. Then, other components 402 may be added to extend component E 402e by referencing extension point identifier ID5.

Figure 5C:
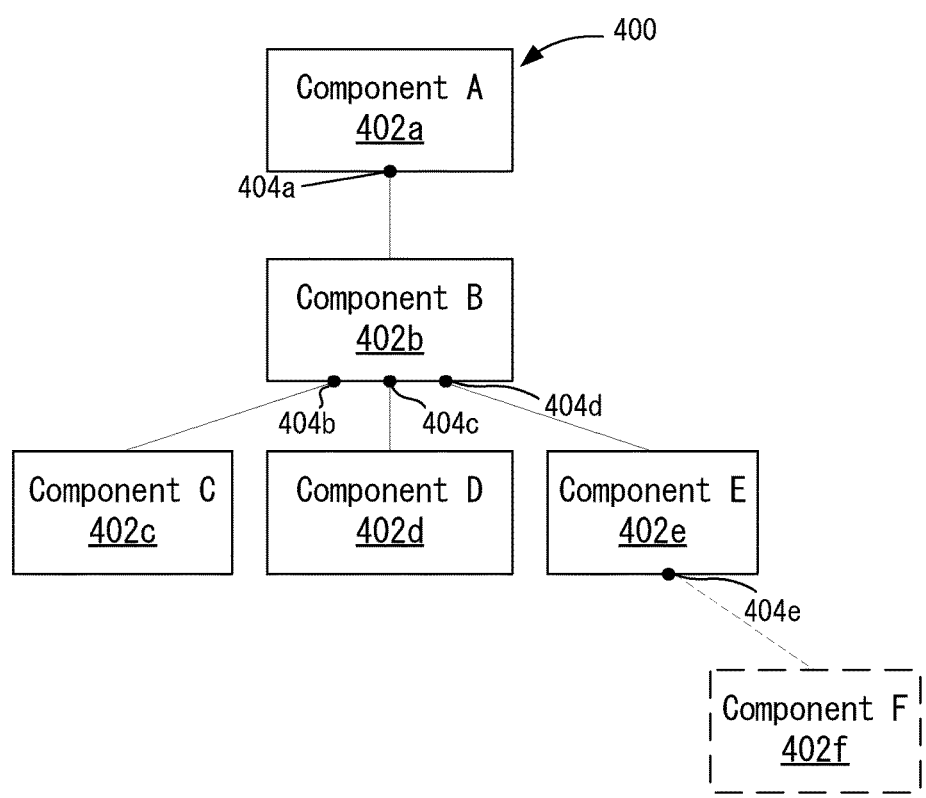
FIG. 5c shows the addition of a component to a dynamically generated extension structure according to one embodiment.

To add component F 402f, a configuration file 110f is added (e.g., by the third party developer of the new plug-in). Configuration file 110f includes extending information 502f that includes the extension point identifier ID5. No hosting information 504f is included. This causes component F 402f to be an extension of component E 402e. FIG. 5c shows the addition of a component F 402f to an extension structure 400 according to one embodiment. As shown component F 402f has been added as an extension of newly added extension point 404e.

When navigation manager 108 dynamically generates extension structure 400, component F 402f is added by virtue of the adding of configuration file 402f and modifying of configuration file 402e. Navigation manager 108 can then navigate to component F 402f using the dynamically generated extension structure 400. The dynamic generation may occur during runtime of the application.

Figure 5D:
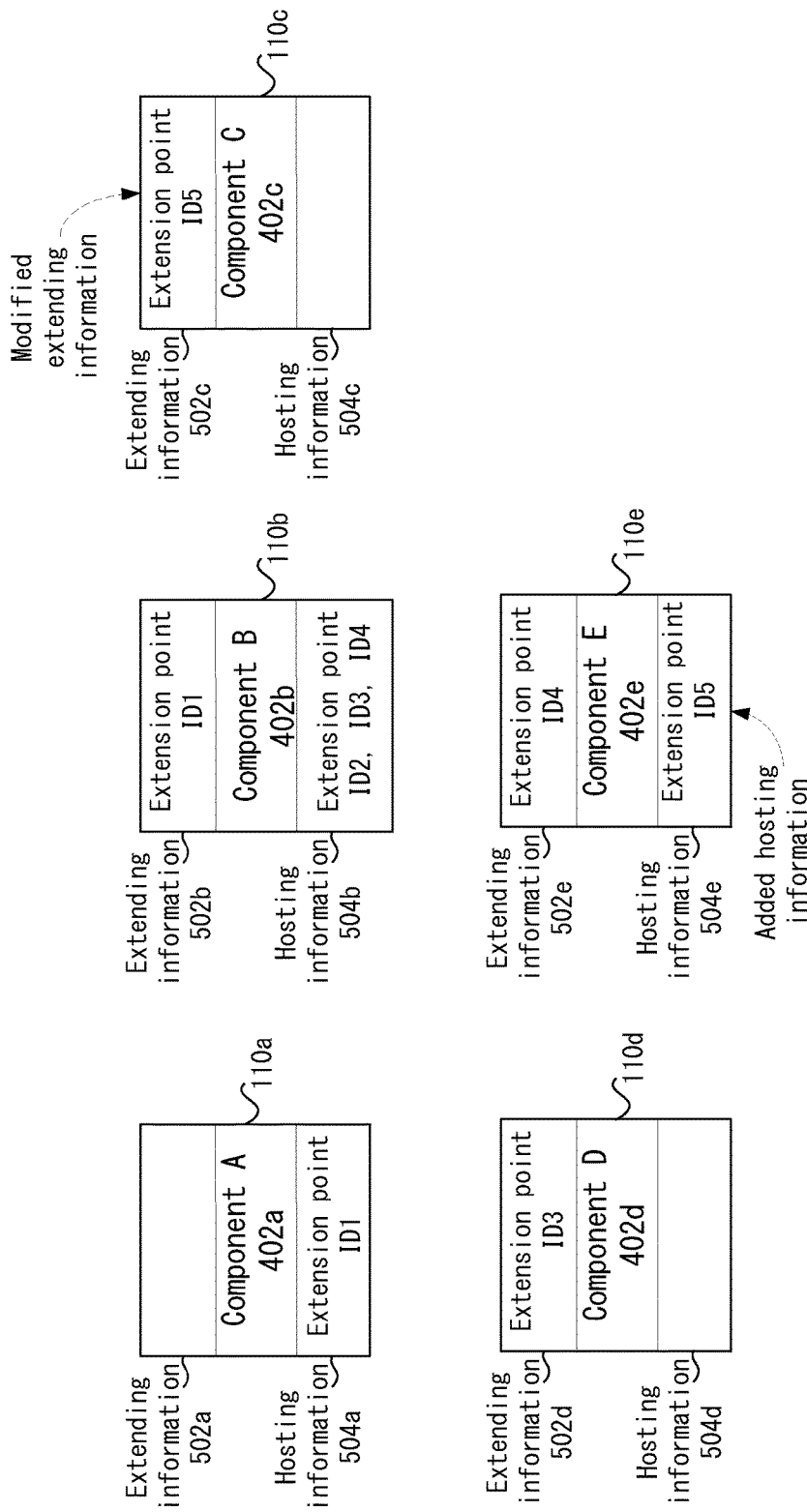
FIG. 5d shows the changes to configuration files to move a component according to one embodiment.
Figure 5E:
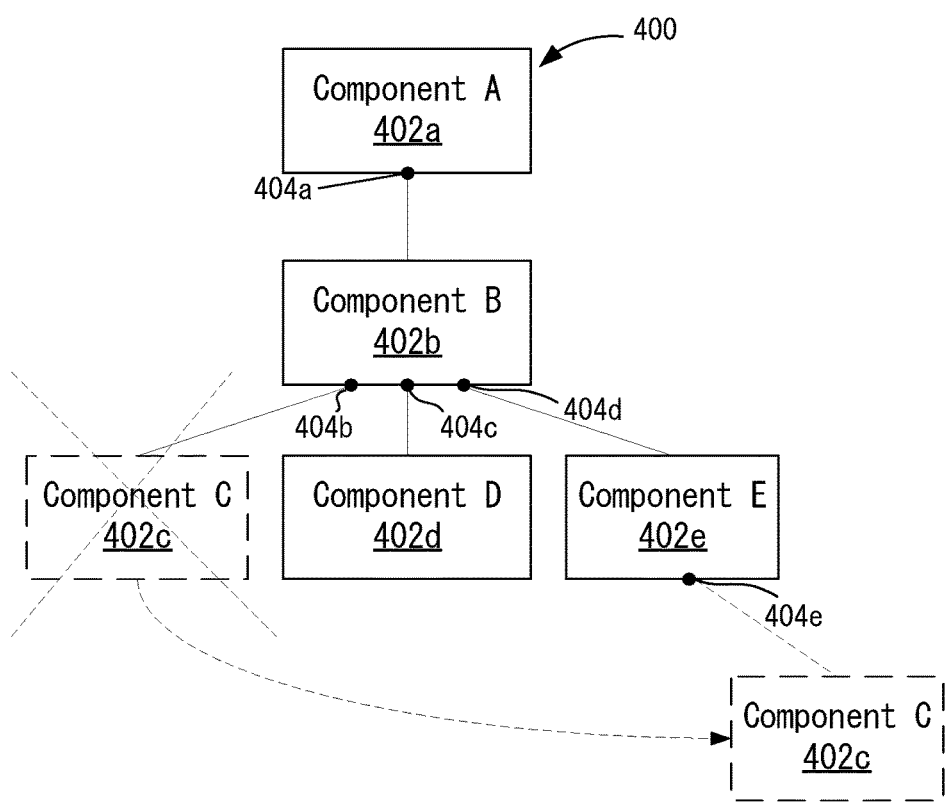
FIG. 5e shows a change in the layout of a dynamically generated extension structure according to one embodiment.

In another example, a component 402 may be moved in extension structure 400. FIG. 5d shows the changes to configuration files 110 to move component C 402c according to one embodiment. For example, configuration file 110e is modified to include hosting information 502e to indicate an extension point identifier ID5, which adds extension point 404e. Also, configuration file 110c is then modified to indicate that this component is an extension of component E 402e. For example, extending information 502c is modified to indicate an extension point identifier ID5. These changes move component C 402c to be an extension of component E 402e. Thus, the layout of the extension structure 400 has been changed by changing the identifiers in configuration files 110. When navigation manager 108 dynamically generates extension structure 400, the extension structure results in the different layout. For example, FIG. 5e shows a change in the layout of a dynamically generated extension structure 400 according to one embodiment. As shown, component C 402c is moved to a different level to be an extension of component E 402e.

Figure 6:
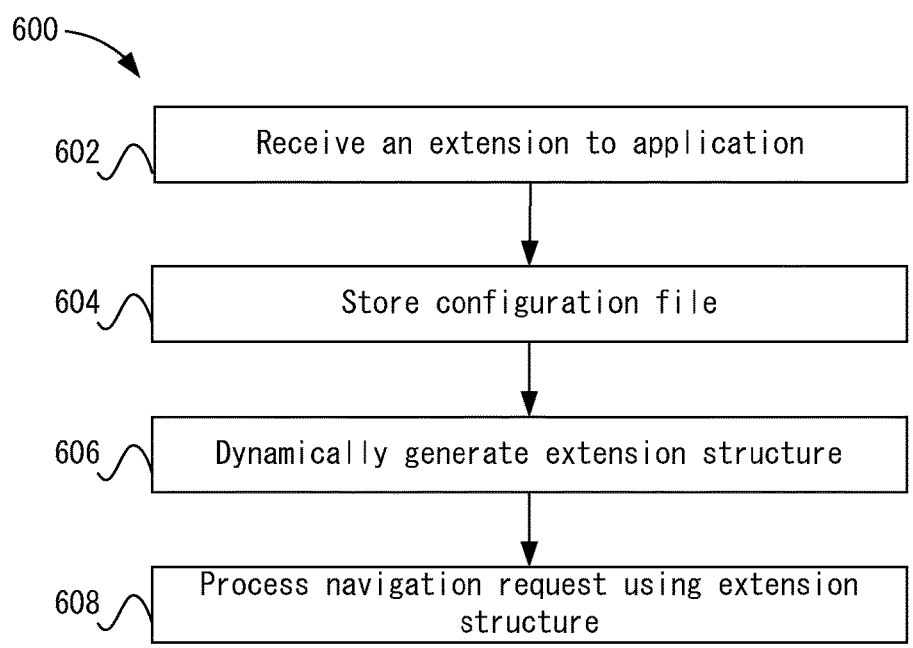
FIG. 6 depicts a simplified flowchart of a method for extending the application according to one embodiment.

Accordingly, changing configuration files 110 allows a user to extend application 106. FIG. 6 depicts a simplified flowchart 600 of a method for extending application 106 according to one embodiment. At 602, an extension to application 106 is received. For example, as previously discussed, a third party developer may desire to install or otherwise load a new plug-in into application 106 to extend its functionality. The plug-in bundle that is loaded into application 106 may include executable code for components that make up the plug-in as well as new and modified configuration files 110 that respectively correspond to components of the plug-in to accommodate the plug-in within the overall GUI of application 106.

At 604, configuration file 110 is stored. At 606, extension structure 400 is dynamically generated from the stored configuration files. For example, at runtime, extension structure 400 may be dynamically generated.

At 608, a navigation request is processed using the dynamically generated extension structure 400 generated at 606. For example, navigation requests are processed as described above.

Figure 7:
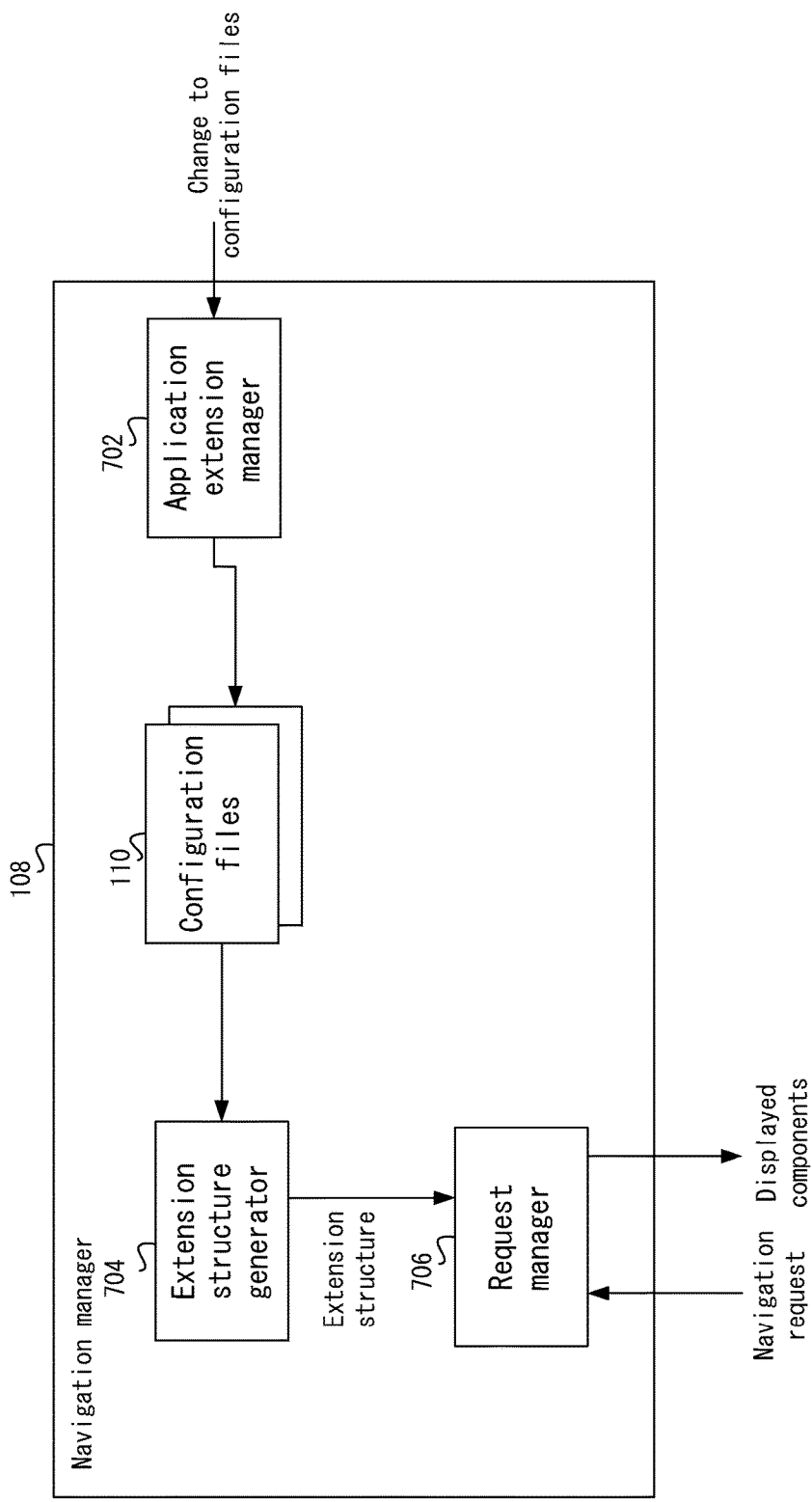
FIG. 7 shows a more detailed example of navigation manager according to one embodiment.

FIG. 7 shows a more detailed example of navigation manager 108 according to one embodiment. An application extension manager 702 receives an extension (e.g., plug-in or other add on technology) to application 106. For example, as previously discussed, such an extension may take the form of a bundle including executable code for components in the plug-in as well as new and/or modified configuration files 110.

An extension structure generator 704 receives the configuration files 110 and can dynamically generate extension structure 400 using the new configuration files 110.

A request manager 706 receives the new extension structure 400 and then can process requests using the dynamically generated extension structure 400. For example, navigation to the target component is performed and components in the path to the target component are displayed.

FIG. 8a shows an example of extension and hosting information in configuration files according to one embodiment. In such an embodiment, for example, configuration files 110 may take the form of XML files or other similar markup languages having tags and values for such tags. Identifier 800 of FIG. 8a depicts an example configuration file for a root component such as component A 402a. As depicted in FIG. 8a, the name or identifier for component A 402a indicated by 802 as "some.namespace1.climateView." The <hostedPoint> tag indicates that component A 402a is hosting an extension point with an identifier of "some.namespace1.cityClimateDetails", which corresponds to 504a of FIGS. 5a and 5b. A section 804 includes additional characteristics, traits, settings or other information for component A 402a. For example, section 804 includes a name (i.e., "Climate") that can be displayed on GUI 104 when component A 402a is rendered. As further depicted at 806, the configuration file for component A 402a may also expose additional characteristics, traits, settings or other information for extension point 504a in a tag <extensionPoint> separate from the information contained within the tag <extension> that generally describes the contents of component A402a itself.

As further depicted in the embodiment of FIG. 8a, a configuration file for component B 402b is shown as 801. At 808, the identifier for component B 402b is depicted as "some.namespace2.weatherView." The tag <extendedPoint> for component B 402b corresponds to 502b of FIGS. 5a and 5b and provides an identifier of the extension point from which component B 402b has been extended, namely the extension point identified by 810 as "some.namespace1.cityClimateDetails" which is hosted in component A 402a. As further depicted in 812, additional characteristics, traits, setting or other information for component B 402b may be stored within the configuration file. It should be recognized that alternative embodiments may not utilize a separate configuration file for each component as depicted in FIG. 8a. For example, in one embodiment, plug-in bundle may include a single configuration file that contain extending and hosting information for all new components of the plug-in FIG. 8b shows an example of pseudo-code for components that are compliant with a navigation framework according to one embodiment. For example, the pseudo-code for class climateView in FIG. 8b represents code for component A 402a. As depicted and previously discussed, the class climateView exposes a method, activateChildComponent ( ), that enables navigation manager 108 to request loading of a child component in a callback function. In particular, "activateChildComponent (String component ID)" can be used by navigation manager 108 to request component A 402a to load a child component (identified by "component ID") in a callback function that is invoked when component A 402a itself has been successfully loaded or rendered.

Similarly, the pseudo-code for class WeatherView in FIG. 8b represents code for component B 402b. As depicted, the class WeatherView exposes methods (e.g., selectedCity ( ) and numberOfForecastDays ( ) to "get" or "set" the value of certain properties of component B 402b that may be displayed when component B 402b is rendered on GUI 104. For example, in accordance with a navigation request as described herein, navigation manager 108 may ultimately set a particular city and a number of forecast days once component B 402b is loaded into GUI 104.

FIG. 8c shows an example of a structure of a navigation request received by a navigation manager according to one embodiment. Such a navigation request may be generated by application 106, for example, when a user interacts with a particular component in GUI 104 in an effort to navigate to a different component of navigation 106. As depicted in the particular example of FIG. 8c, the target component in the navigation request is identified as "some.namespace2.weatherView" which is the identifier for component B 402b as depicted in 808 of FIG. 8a. Thus, this navigation request is requesting navigation to component B 402b. Further, as shown, the navigation request further requests that certain properties of the target component set, namely that the "selectedCity" property is set to "Palo Alto", and that the "numberOfForecastDays" property is set to 3. In one embodiment, navigation manager 108 may set such properties by invoking the methods selectedCity ( ) and numberOfForecastDays ( ) after component B 402b, WeatherView, is rendered in GUI 104.

As previously detailed herein, to navigate to the target component, navigation manager 108 first loads component A 402a, the "climateView", and then asks component A 402a to load the child component B 402b, the "weatherView." Then, the given properties in child component B 402b are set such that the desired data is displayed.

Accordingly, particular embodiments allow an application 106 to be extensible. The extensibility is flexible in that places in application 106 where extensions are allowed do not need to be specified. Rather, configuration files 110 are used to specify that a component is an extension of another component and also may host extension points. Extension structure 400 is dynamically generated and realizes any extensions that may have been received. Also, different entities (e.g., companies) can extend the same application 106.

The navigation solution also allows only a target component to be specified in a navigation request. Thus, navigation to a target component that is arbitrarily nested within other components can be performed whether or not the target component has been instantiated in GUI 104 at the time of the request. Also, components that have been introduced after the navigation solution in navigation manager 108 has been developed can be used because of the dynamic generation of extension structure 400.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more computer readable storage media. The term computer readable storage medium refers to any data storage device that can store data which can thereafter be input to a computer system—computer readable media may be based on any existing or subsequently developed technology for embodying computer programs in a manner that enables them to be read by a computer. Examples of a non-transitory computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

It should be recognized that many variations, modifications, additions, and improvements are possible. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents may be employed without departing from the scope of the invention as defined by the claims.

What is claimed is:

1. A method comprising:
   receiving, by a computing device, configuration information for a set of components of an extensible application, wherein each component in the set of components individually includes extending information if the component is an extension of another component and hosting information if the component is hosting a set of extension points;
   dynamically generating, by the computing device, an extension structure at runtime of the application from the configuration information, wherein the extension structure is generated by dynamically connecting components together based on the individually included extending information and the hosting information of the set of components;
   receiving, by the computing device, a navigation request to a target component;
   determining, by the computing device, a path of components to the target component using the dynamically generated extension structure;
   traversing, by the computing device, the path of components until the target component is loaded; and
   displaying, by the computing device, the target component.

2. The method of claim 1, wherein the extending information for a component identifies an extension point that the component is extending.

3. The method of claim 1, wherein the hosting information for a component identifies one or more extension points the component hosts and allows other components to reference an extension point of the component.

4. The method of claim 1, further comprising:
   loading each component in the path; and
   displaying each component including the target component.

5. The method of claim 1, wherein traversing comprises:
   requesting a loading of a component in the path;
   receiving a confirmation indicating the component has been loaded; and
   requesting a loading of a next component in the path upon receiving the confirmation, wherein the requesting is performed until all components in the path have been loaded and confirmation of the loadings have been received.

6. The method of claim 5, wherein loading the component comprises executing a method using an identifier of the component to be loaded, the method including callback information configured to cause the confirmation to be sent by the loaded component with information for the loaded component.

7. The method of claim 1, further comprising setting a property of the target component upon the target component being loaded to set a state of the target component.

8. The method of claim 1, wherein determining the path comprises traversing the extension structure from a root component to the target component to determine the path of components.

9. The method of claim 1, further comprising:
   receiving configuration information for an extension component as an extension to the application, the extension component individually including extending information if the extension component is an extension of another component and hosting information if the component is hosting a set of extension points, and
   dynamically re-generating the extension structure using the configuration information for the set of components and the extension component.

10. The method of claim 9, wherein the extension structure is dynamically re-generated using an addition, deletion, or modification of configuration information for the extension component.

11. A method comprising:
    receiving, by a computing device, an extension component to an extensible application, the extension component individually including extending information if the component is an extension of another component and hosting information if the component is hosting an extension point;

dynamically generating, by the computing device, an extension structure at runtime of the extensible application, wherein the extension structure is generated by dynamically connecting components of the application together based on individually included extending information and hosting information of the components, wherein the extension component is realized in the extension structure;

receiving, by the computing device, a navigation request to a target component;

determining, by the computing device, a path of components to the target component through the dynamically generated extension structure;

requesting, by the computing device, using a navigation manager, a loading of a component of the path with callback information to the navigation manager;

receiving, by the computing device, confirmation that the component has been loaded via the callback information;

continuing, by the computing device, the requesting with other components in the path until the target component is loaded and confirmation is received for the loading of the other components and the target component; and displaying, by the computing device, the loaded components.

12. The method of claim 11, wherein the extending information for a component identifies an extension point that the component is extending.

13. The method of claim 11, wherein the hosting information for a component identifies one or more extension points the component hosts and allows other components to reference an extension point of the component.

14. The method of claim 11, further comprising setting a property of the target component upon the target component being loaded to set a state of the target component.

15. The method of claim 11, wherein the extension structure is dynamically generated using an addition, deletion, or modification of configuration information for the extension component.

16. A non-transitory computer-readable storage medium containing instructions that, when executed, control a computer system to be configured to:

receive configuration information for a set of components of an extensible application, wherein each component in the set of components individually includes extending information if the component is an extension of another component and hosting information if the component is hosting a set of extension points;

dynamically generate an extension structure at runtime of the application from the configuration information, wherein the extension structure is generated by dynamically connecting components together based on the individually included extending information and the hosting information of the set of components;

receive a navigation request to a target component;

determine a path of components to the target component using the dynamically generated extension structure;

traverse the path of components until the target component is loaded; and display the target component.

17. The non-transitory computer-readable storage medium of claim 16, further configured to:

load each component in the path; and display each component including the target component.

18. The non-transitory computer-readable storage medium of claim 16, wherein traverse comprises:

request a loading of a component in the path;

receive a confirmation indicating the component has been loaded; and request a loading of a next component in the path upon receiving the confirmation, wherein the requesting is performed until all components in the path have been loaded and confirmation of the loadings have been received.

19. The non-transitory computer-readable storage medium of claim 18, wherein load the component comprises execute a method using an identifier of the component to be loaded, the method including callback information configured to cause the confirmation to be sent by the loaded component with information for the loaded component.

20. The non-transitory computer-readable storage medium of claim 16, further configured to:

receive configuration information for an extension component as an extension to the application, the extension component individually including extending information if the extension component is an extension of another component and hosting information if the component is hosting a set of extension points, and dynamically re-generate the extension structure using the configuration information for the set of components and the extension component.

* * * * *